United States Patent

Bohannan et al.

[11] Patent Number: 5,203,648
[45] Date of Patent: Apr. 20, 1993

[54] INDEXABLE INSERT FOR THREAD CUTTING AND SLOTTING

[76] Inventors: Richard D. Bohannan, Box 203; Reinar Schmidt, Box 149, both of S-771 01 Ludvika, Sweden

[21] Appl. No.: 777,327
[22] PCT Filed: May 31, 1990
[86] PCT No.: PCT/SE90/00378
 § 371 Date: Nov. 26, 1991
 § 102(e) Date: Nov. 26, 1991
[87] PCT Pub. No.: WO90/14930
 PCT Pub. Date: Dec. 13, 1990

[30] Foreign Application Priority Data

May 31, 1989 [SE] Sweden ................ 8901967

[51] Int. Cl.⁵ .................. B23B 27/04; B23B 27/16
[52] U.S. Cl. ....................... 407/113; 407/117
[58] Field of Search ............. 407/113, 114, 103, 66, 407/90, 81, 117

[56] References Cited

U.S. PATENT DOCUMENTS

| | | |
|---|---|---|
| 3,613,197 | 10/1971 | Stier ................. 407/113 |
| 4,169,690 | 10/1979 | Kendra ............... 407/90 |
| 4,669,925 | 6/1987 | Lowe et al. ........ 407/114 |
| 4,674,925 | 6/1987 | Thornton et al. ... 408/1 R |
| 4,890,961 | 1/1990 | Carl et al. ......... 407/105 |

FOREIGN PATENT DOCUMENTS

| | | |
|---|---|---|
| 2504012 | 10/1975 | Fed. Rep. of Germany ...... 407/113 |
| 2522735 | 12/1975 | Fed. Rep. of Germany ...... 407/113 |
| 1024167 | 6/1983 | U.S.S.R. ....................... 407/113 |
| 2070472 | 9/1981 | United Kingdom . |

Primary Examiner—Steven C. Bishop
Attorney, Agent, or Firm—Watson, Cole, Grindle & Watson

[57] ABSTRACT

In thread cutting and slotting, indexable inserts of hard metal are now used. Usually, the inserts used have been of triangular type. In order to improve cutting economy, implying improved positioning, closer tolerances and increased strength, the insert (1) is formed with four cutting edges (2) with intermediate contact surfaces (4, 5) and is adapted for vertical mounting in an insert holder (9). Through this design, the cutting forces will be absorbed in a large angular area of the cutting edges, and the cutting forces will essentially act in the plane of the insert.

2 Claims, 1 Drawing Sheet

INDEXABLE INSERT FOR THREAD CUTTING AND SLOTTING

RELATED APPLICATION

This application is related to copending design patent application Ser. No. 07/442688, filed Nov. 29, 1989.

TECHNICAL FIELD

The present invention relates to indexable inserts for thread cutting and slotting to be used, for example, in the threading of workpieces by means of automatically controlled machine tools.

PRIOR ART

There are different methods of producing threads and slots, involving either plastic machining or machining by means of cutting of a blank of, for example, screw or nut type. The most frequent method for producing threads for screws, bolts and nuts is plastic machining by means of thread rolling, in which the thread profile is pressed into the surface of the material. Machining by means of cutting comprises the following methods: use of threading taps and threading dies, thread milling, grinding and chasing. In thread chasing, the thread is cut into the rotating workpiece using a tool edge, such as a cutting insert, suitably of indexable type, clamped in an insert holder. With modern NC and CNC lathes/machine tools, threads can be made quickly and efficiently using cutting inserts and holders for same. The counterpart of the thread cutting of a workpiece is an ordinary turning operation, in which the feeding per revolution corresponds to the thread pitch. The pointed end of an indexable insert is usually cut to a profile intended to correspond to, for example, the space between two thread sides. The chip cutting thickness is determined by the cutting depth. The feeding movement of the tool must be related to the rotary movement of the work spindle. Often, a feeding function as such is provided in the lathe. An operator or computer monitors and controls the actual threading.

Indexable inserts for thread cutting and slotting have been available on the market since the early 1960s. Usually, triangular cutting inserts of positive or negative cut type have been used for horizontal as well as vertical mounting in the cutting insert holder. There are certain disadvantages associated with cutting inserts of this type, since it may be difficult to locate the insert accurately in the holder and there is a risk of insert rupture. As a result of the development as regards equipment, greater demands have to be made as to locating tolerances, and improved built-in safety as regards insert rupture must be demanded, especially in view of the use of unmanned machine tools in continuous operation. Owing to the large investments in equipment required today, cutting economy has become an issue of ever greater importance to companies.

SUMMARY OF THE INVENTION

In order to improve cutting economy, the indexable insert for thread cutting and slotting according to the invention is provided with four cutting edges instead of two or three, which can be done at approximately the same cost. The cutting edge having a substantially square shape with plane contact surfaces on each side, which contact surfaces are located between the cutting edges at right angles to each other, achieves much greater accuracy as regards location and orientation when mounting the insert in the holder. With this design, much closer tolerances are possible than in the case of other types of cutting inserts. Owing to the almost straight corners of the insert and owing to the insert being upended instead of placed in a horizontal position, a much stronger cutting edge is obtained. The cutting forces will act on the corners of the insert within a larger angular area as compared to previously known solutions and the forces will essentially be absorbed by a large part of the entire insert, whereby the risk of insert rupture is considerably reduced. The same cutting insert may be used for right-and left-handed threading and in certain cases also for internal threading. Thanks to the square shape of the insert, two cutting edges of an insert may be ground at the same time, implying an improvement in production technique.

DESCRIPTION OF AN EMBODIMENT

Figure 1:
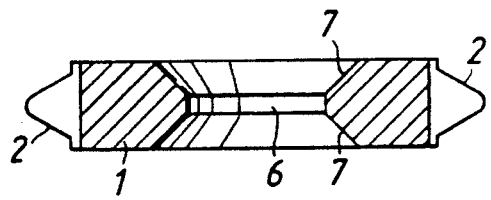
FIG. 1 is a cross section as seen along line 1—1 of the invention cutting insert as shown in FIG. 2.
Figure 2:
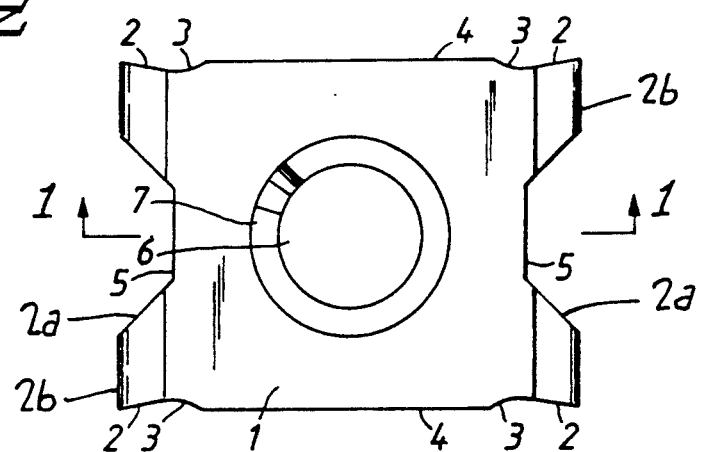
FIG. 2 is a plan view of the inventive cutting insert.
Figure 3A:
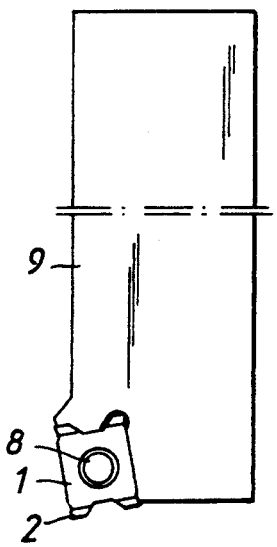
FIGS. 3A and 3B are views showing the cutting insert mounted in a holder.
Figure 3B:
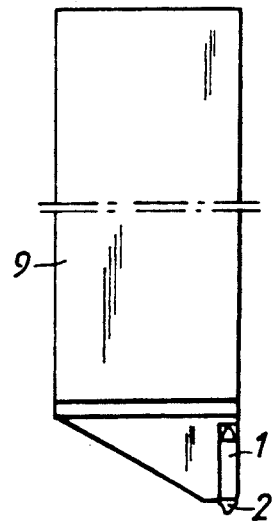

FIGS. 1 and 2 show a cross section and a plan view of a possible configuration of a hard-metal indexable cutting insert 1 for thread cutting and slotting according to this invention. The cutting insert 1 is of the indexable type and is of substantially square shape having a centrally located clamping hole 6 for clamping the insert 1 in an insert holder 9 (see FIGS. 3A and 3B). At each corner of the insert 1 there is provided a bevelled/-ground, longitudinal cutting edge 2. On one pair of opposed sides of the insert the cutting edges 2 are arranged in pairs with an intermediate plane contact surface 5. A bevel surface 2a extends between each contact surface 5 and the flank 2b of each cutting edge 2. The cutting edges 2 arranged in pairs are oriented outwardly away from each other, seen from centre line I—I. The planes of the cutting edges 2 on the sides of the other pair will then partially coincide with the planes of said sides, which will also act as additional contact surfaces. The opposed contact surfaces 4 and 5 arranged in pairs are used as contact surfaces when clamping the insert in the holder and are perpendicular relative to each other, which helps to achieve an extremely accurate positioning when clamping the cutting insert 1 in the holder 9. The clamping hole 6, on both sides of the cutting insert, can be provided with a bevel 7, which in combination with suitable clamping means 8 will contribute towards the insert 1 being better fixed and clamped in the holder 9 as well as towards the insert being fully reversible, if required, and then fixed to the holder again. In front of each cutting edge, the insert is provided with a chip breaker or deflector 3. The insert 2 is clamped in the holder 9 in a vertical position by suitable clamping means 8. With this type of clamping and fixation of the insert 1 in the holder 9, a favourable distribution of the cutting forces in the plane of the insert is achieved and the cutting forces will essentially act in the plane of the insert, whereby the risk of insert rupture is reduced. Together with the cutting edges, the corners of the insert take up a large angular area, which also results in a favourable distribution of the forces in the cutting edge.

We claim:

1. An indexable insert for thread cutting and slotting which is adapted to be vertically mounted on a holder, said indexable insert being made of hard metal and substantially square, defining opposite faces which are substantially flat and parallel, first and second pairs of opposite sides, and a center hole which extends through said indexable insert from one face to the other, the first pair of opposite sides being substantially flat and parallel and each side of the second pair of opposite sides forming two cutting edges separated by a plane contact surface which is perpendicular to each of the first pair of opposite sides, each cutting edge defining a flank, and a bevel surface extending from each flank to an adjacent plane contact surface, said indexable insert being reversible and usable for right-or left-hand threading.

2. The indexable insert according to claim 1, wherein said center hole is bevelled adjacent each of said opposite faces.

* * * * *